Dec. 10, 1963     W. C. SPOONCER     3,113,552
COMBINED ROAD MAP AND OBSTRUCTION MARKER
Filed Jan. 11, 1962     2 Sheets-Sheet 1
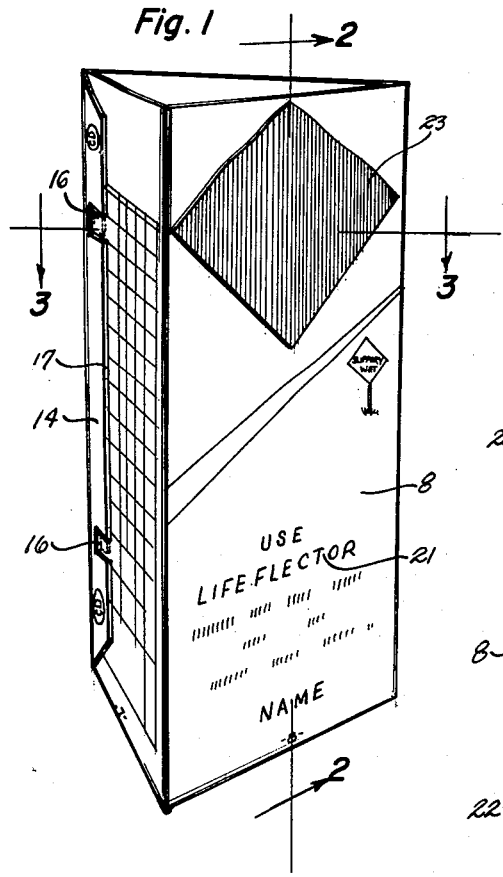
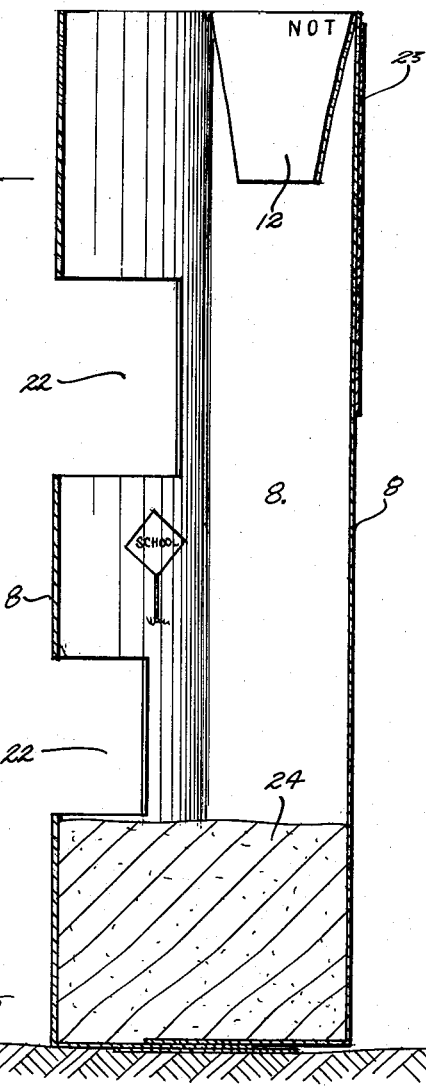
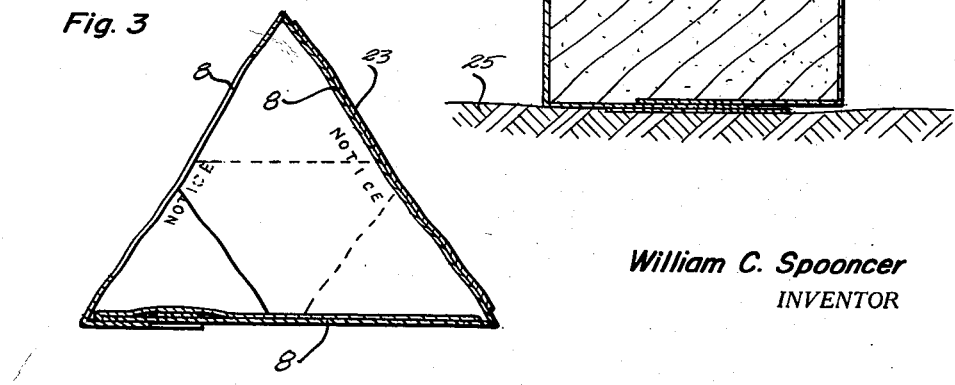
William C. Spooncer
INVENTOR Dec. 10, 1963　　　W. C. SPOONCER　　　3,113,552
COMBINED ROAD MAP AND OBSTRUCTION MARKER
Filed Jan. 11, 1962　　　　　　　　　　　　　　2 Sheets-Sheet 2

William C. Spooncer
INVENTOR

United States Patent Office 3,113,552
Patented Dec. 10, 1963

3,113,552
COMBINED ROAD MAP AND OBSTRUCTION MARKER
William C. Spooncer, P.O. Box 14, Rio Nido, Calif.
Filed Jan. 11, 1962, Ser. No. 165,588
1 Claim. (Cl. 116—63)

This invention relates to highway travel, particularly by automobiles and the like.

The advent of the modern day system of highways all across our country and the excellent guiding signs thereon, has not as one might at first assume, completely done away with the need of individual road maps by motorists and truck drivers who for either business or pleasure are more or less constantly driving from one city to another. Neither has the motor vehicle reached the point of perfection that they will no longer break down at the most unexpected times and inconvenient places along a highway.

It is, therefore, an object of this invention to provide a combined road map and obstruction marker that can readily furnish much needed information and highway travel directions in the form of a map or the like to anyone who ever drives on a highway.

Another object of this invention is to provide a combined road map and obstruction marker that can be set up on a highway or in a street to warn other drivers that one's car is parked or broken down.

Another object of this invention is to provide a combined road map and obstruction marker on which can be printed any desired information of value to the highway traveler.

Another object of this invention is to provide a combined road map and obstruction marker that will not only serve the useful purpose of providing motor vehicle drivers with a road map and obstruction marker but will also contain advertising matter of the distributor of the device.

Another object of this invention is to provide a combined road map and obstruction marker that can readily be formed into a practical three dimensional obstruction marker that can be placed on a highway or in a city street to warn others of either a parked or broken down vehicle or of some other obstruction dangerous to vehicular traffic and or pedestrians.

Another object of this invention is to provide a combined road map and obstruction marker that can be set up for use as a marker in a minimum of time and with a minimum of effort.

Another object of this invention is to provide a combined road map and obstruction marker that can be produced at a cost low enough to permit their distribution as advertising matter.

Another object of this invention is to provide a combined road map and obstruction marker that is of one piece construction that does not require either skill or tools for its forming into an obstruction marker.

Still another object of this invention is to provide a combined road map and obstruction marker that has phosphorescent substance thereon that will immediately attract the attention of a vehicle driver and thus warn him or her of an obstruction ahead.

Other and further objects and advantages of this invention will be hereinafter described, and the novel features thereof defined in the appended claim.

Referring to the drawing:

FIGURE 1 is a pictorial view of this invention formed into an obstruction marker ready for use;

FIGURE 2 is an enlarged sectional view taken substantially along line 2—2 of FIGURE 1 as viewed in the direction indicated by the arrows;

FIGURE 3 is an enlarged sectional view taken substantially along line 3—3 of FIGURE 1 as viewed in the direction indicated by the arrows;

FIGURE 4 is an enlarged view of this invention opened up flat for use as a road map and the like.

Similar reference characters refer to similar parts throughout the several views of the drawings.

Figure 4:
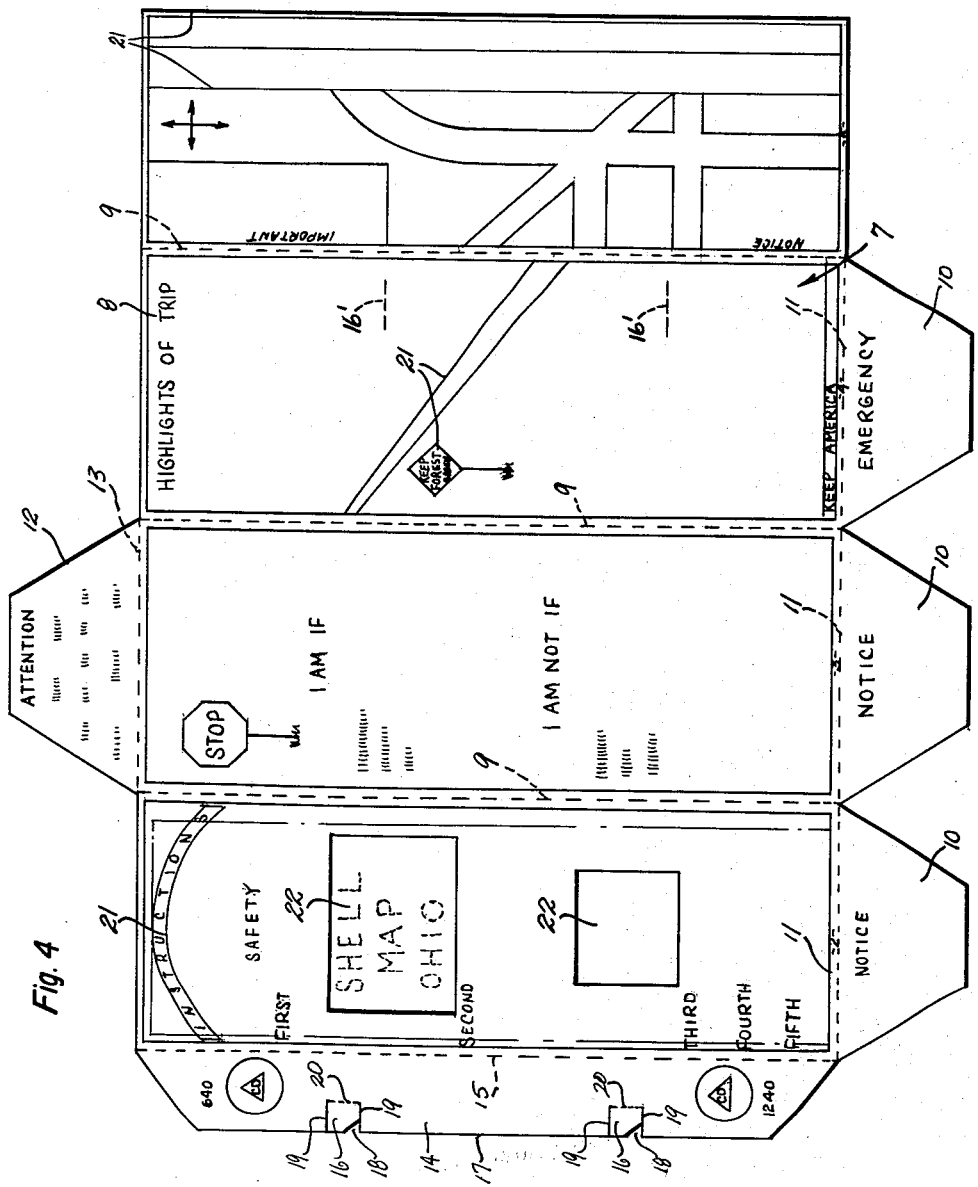

Having reference now to the drawings in detail, there is generally indicated by the character 7 a sheet of any fairly rigid material such as heavy paper or cardboard that is basically rectangular in plan form (FIGURE 4), and is divided into a plurality of rectangular panels 8 by the dash lines 9 which also serve as the fold lines of this invention. All of the said panels 8 have a trapezoidal shaped tab 10 on one end thereof. A bottom dash line 11 along the tab end of each one of the said rectangular panels 8 indicate the place for folding each of the said trapezoidal shaped tabs when the device is made into an obstruction marker. A tab 12, also trapezoidal in shape is located at the other end of that panel 8 that is next to one of the end panels. The last mentioned tab is also folded along a dash line 13 indicated in the forementioned FIGURE 4 of the drawings. A side tab 14 also trapezoidal in plan form is located at and forms a part of one of the panels that is at an end of the said sheet of rigid material 7. A dash line 15 indicates where the said side tab 14 is to be folded when the device is formed into the forementioned obstruction marker. Locking tabs 16 are formed into the outer edge 17 of the side tab 14 to secure the form of the invention when it is folded into the prism-shaped structure indicated by FIGURES 1 and 3 of the appended drawings by insertion into the slots 16' which can obviously only be seen in the opened up flat view of this invention designated as FIGURE 4 in the appended drawings. The said locking tabs 16 can be of any desired shape and at any desired location along the side tab 14, however, the suggested form as illustrated in FIGURE 4 is rectangular with a triangular cut-out 18. The tab itself is cut or otherwise separated from the said side tab 14 along the solid lines 19 that are parallel to one another. The tabs 16 each fold inward along the dash line 20 that connects with the two said solid lines 19 of each tab. The detailed method by which the tabs function is obvious to all experienced in the art and therefore need no further description be made in this specification.

In the above described embodiment of this invention there are as one can clearly see by examination of the appended drawings, only four of the said panels 8 though the number, of course, is not limited, the invention can have any number of panels. In the event more than four panels are adapted, then the shape of the device when formed into an obstruction marker need not necessarily be wedge-shaped. In other words, the shape can be whatever one so desires consistent with the number of sides of the article.

Any driving instructions, safety rules, highway information, advertising matter, road and or city maps may of course be printed or otherwise placed on the outside of the said sheet of rigid material 7 that makes up into this novel and useful invention. The printing or its equivalent is indicated on the various figures of the appended drawings by the reference character 21. Openings 22 may be made into one or more of the panels 8 for viewing any data or maps and the like that may be located on one of the other of the said panels.

A piece of phosphorescent substance 23 is secured to one of the said panels 8 of which it is near that end having the already mentioned tabs 12.

When this invention is formed into the already mentioned construction marker, earth, rock or in fact almost any solid and weighty material may be placed inside the formed wedge shape and on top of the trapezoidal-shaped tabs 10 which of course have been folded "inward" at right angle to the panels. The fold of each tab being made along the forementioned dash line 19. The forementioned solid and weighty material is indicated in FIGURE 2 of the appended drawing by the numeral 24 where the obstruction marker is seen to be resting in an upright position on the ground 25.

This unique invention of mine has now been fully described and its exact method of forming into the said wedge shape for use as an obstruction marker is clearly shown in the appended drawings where it is obvious that the panels 8 are formed into the said wedge-shape by folding along the dash lines 9. It is also noted in the drawings that in the present embodiment of my invention that the two outermost panels overlap each other. One of these panels of course has the said side tab 14 on its outermost edge.

From the foregoing it will now be seen that there is herein provided a combined road map and obstruction marker which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative, and not in a limiting sense.

What I therefore claim as my invention and desire to secure by Letters Patent is:

A combined road map and obstruction marker of the character described, comprising a plurality of rectangular panels of semi-rigid material, one of the said panels having a trapezoidal tab formed at the top thereof, and one of the said panels having one or more rectangular openings therein to provide the viewing of information contained on the inside of the said panels, and one of the end panels having its outer and long edge terminating in a trapezoidal shaped panel, having a pair of spaced rectangular cut-outs in the outer edge thereof, securing the said panels in a hollow structure having the configuration of an equilateral triangle, when viewed from the top and bottom, and a heavy substance holding the said marker in an upright position by resting on the trapezoidal shaped tabs that are secured to and form a part of the said panels, the said tabs being bent at right angles to the said panels when the said combined road map and obstruction marker is formed into shape, and a phosphorescent substance on one of the outer surfaces of the said panels in order to attract attention to the marker, when the said marker is placed in an upright position on a road.

References Cited in the file of this patent
UNITED STATES PATENTS

| | | |
|---|---|---|
| 2,407,592 | Wathen | Sept. 10, 1946 |
| 2,637,924 | Hutt | May 12, 1953 |
| 2,881,662 | Harris | Apr. 14, 1959 |
| 2,935,238 | Koehler | May 3, 1960 |
| 2,953,114 | Hedger | Sept. 20, 1960 |